United States Patent [19]

Pyle

[11] 4,159,708

[45] Jul. 3, 1979

[54] SOLAR ENERGY COLLECTOR AND HEAT EXCHANGER

[75] Inventor: Donald L. Pyle, Midland, Tex.

[73] Assignee: Near Star Solar, Inc., Midland, Tex.

[21] Appl. No.: 807,443

[22] Filed: Jun. 17, 1977

[51] Int. Cl.² .............................................. F24J 3/02
[52] U.S. Cl. .................................... 126/270; 126/271
[58] Field of Search .............. 126/270, 271; 237/1 A; 165/159, 161

[56] References Cited

U.S. PATENT DOCUMENTS

| | | | |
|---|---|---|---|
| 2,907,318 | 10/1959 | Awot | 126/271 |
| 3,882,925 | 5/1975 | Huber | 165/159 |
| 3,902,474 | 9/1975 | Pyle | 126/271 |
| 3,946,720 | 3/1976 | Keyes et al. | 237/1 A |
| 4,018,211 | 4/1977 | Barr | 126/270 |
| 4,068,652 | 1/1978 | Worthington | 126/270 |
| 4,072,142 | 2/1978 | Lof | 126/270 |

Primary Examiner—John J. Camby
Assistant Examiner—Larry I. Schwartz
Attorney, Agent, or Firm—Richards, Harris & Medlock

[57] ABSTRACT

A solar energy collector and heat exchanger for use in a solar energy system that provides space heating and preheating of water for a building or residence is disclosed. The solar collector and heat exchanger comprises a rectangularly shaped, box-like housing. A thermal pane glass panel covers the top of the housing and permits radiant energy to pass therethrough to the interior of the housing. An arrangement of transversely extending baffles are placed in the lower portion of the housing to define an uncovered serpentine channel running longitudinally through the housing. An air inlet port and an air outlet port are provided in the bottom of the housing to direct air into and out of the channel defined by the baffles. A metallic sheet covers the channel and has airflow connections therethrough leading from the air inlet and air outlet ports to the upper portion of the housing. A fluid system including a planar array of tubing having a number of longitudinal runs that extend parallel to the sides of the housing is provided, with adjacent tubes being interconnected to form a single conduit having an inlet and an outlet extending out of the housing. Additional baffles are provided in the upper portion of the housing to define a serpentine channel therein that overlays the lower channel and communicates with the air inlet and air outlet ports through the airflow connections. The thermal pane glass panel covering the top of the housing defines the ceiling for the upper channel. Curved upper and lower airflow guides are positioned between adjacent baffles in both the lower and upper channels to facilitate a smooth flow of air through each.

17 Claims, 6 Drawing Figures

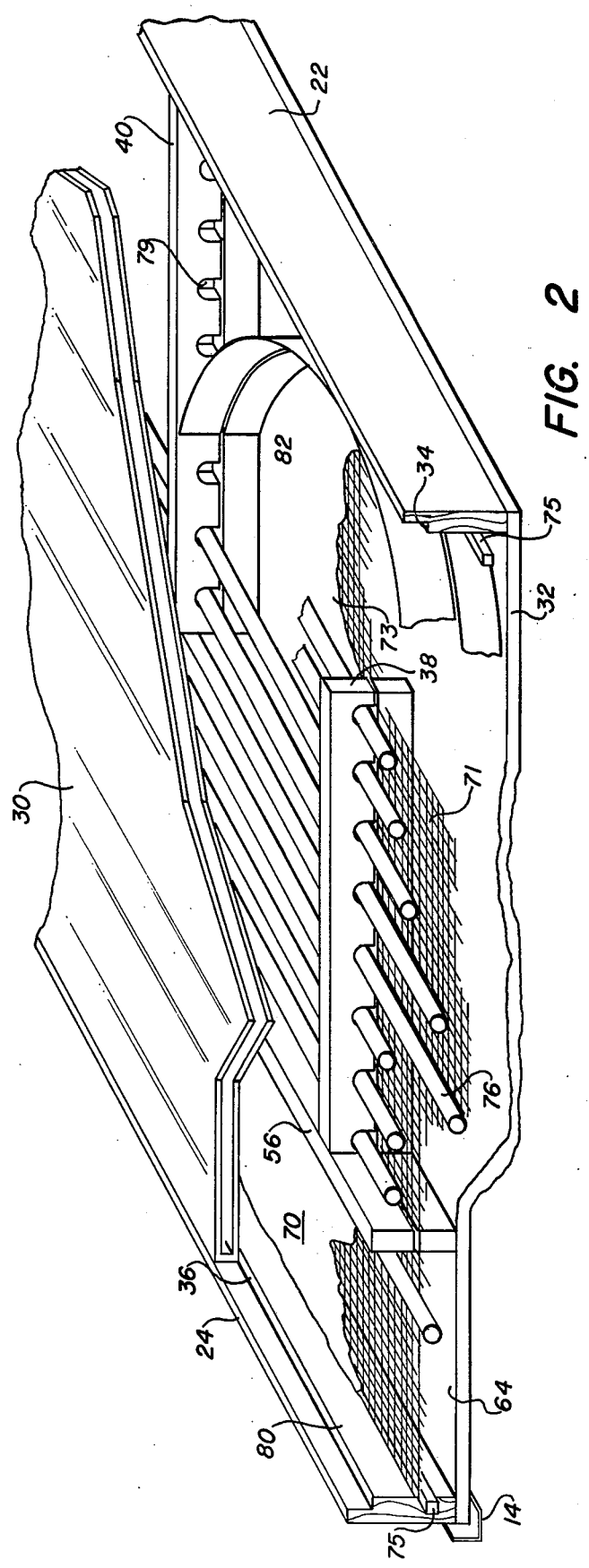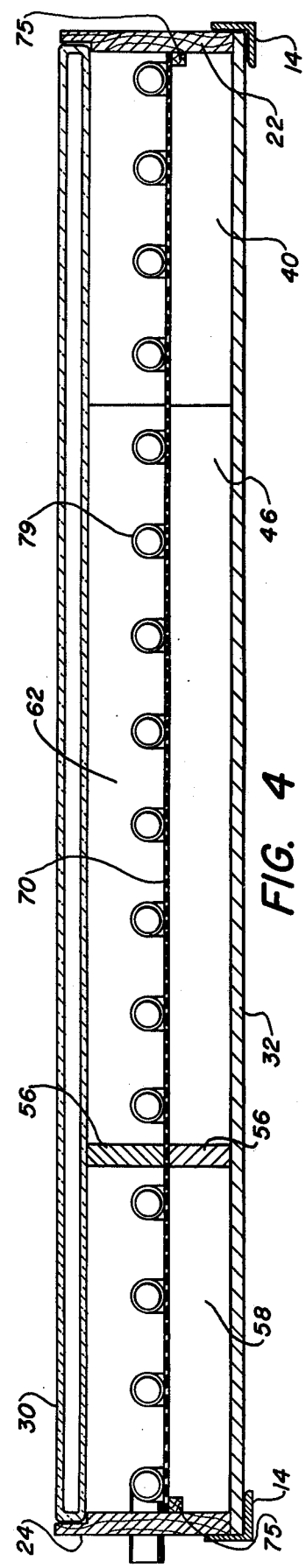

SOLAR ENERGY COLLECTOR AND HEAT EXCHANGER

BACKGROUND OF THE INVENTION

This invention relates to solar energy systems; and more particularly, the invention relates to a solar heat exchanger for use in a solar energy system providing space heating and preheating of water for a commercial building or residence.

The price of hydrocarbon fuels has greatly increased during recent years and is likely to climb still higher. In addition, the reserves of such fuels have dwindled, forcing economists to look ahead to the day when the fuels might be unavailable at almost any price. Alternatives to hydrocarbon fuels, such as nuclear fusion power and coal, present concerns over safety and the environment, and have slowed the move toward such energy sources. Nuclear fusion plants, which promise virtually unlimited power, are still decades away from becoming a reality. Solar power, however, as an alternative, has many attractions. It produces neither pollution nor radioactivity, and it is virtually inexhaustible. Accordingly, in an increasingly resource-conscious society, solar energy is now being considered as an energy source for providing a major part of the heating required for houses.

In order to harness and put solar energy to work heating homes and offices, solar energy systems are required. The object of any type of solar heating system is to catch and accumulate enough of the dispersed energy of the sun to provide useful heat and store enough of it to last through nights and cloudy days.

Solar heating systems are classified as either passive or active. Passive systems collect solar heat and store it without hardware driven by mechanical energy. Active solar heating systems work more like conventional gas or oil heating arrangements, but the sun's radiation, instead of fossil fuels, provides much of the energy. These systems consist of collectors to absorb the sun's heat, ducts or pipes to transport it, and a heat storage area. The active components include fans, pumps, valves and thermostats.

Most solar energy collectors, which operate as heat exchangers, function in essentially the same manner. A metal surface (copper, aluminum or steel) is painted black to absorb solar radiation and is enclosed in a well-insulated glass or plastic-topped housing designed to trap the sun's energy and contain it to then be conducted into a portable medium for storage. The two media used to collect, transport and store heat are air and liquid (usually water).

In an air system, air circulating around the collector plates picks up heat and is moved into spaces to be heated. In a liquid system, a liquid passes through tubes attached to the collector surface, picks up heat by conduction, and then moves into a water storage tank for use as needed. Therefore, as can be appreciated, a critical element in any solar energy heating system is the solar collector or heat exchanger which must convert solar energy into stored heat, in the media used to transport and store the heat, in a highly efficient manner.

One solar heat converter in the prior art is that disclosed in U.S. Pat. No. 3,902,474 issued to the inventor of the present invention. The solar heat converter disclosed therein comprises a box having baffles therein that define an uncovered serpentine channel in the lower portion of the box. The channel leads from an air inlet port to an outlet port formed in the box. A thermal glass panel covers the box and exposes the interior of the channel to the sun's rays. The box also contains a piping system following a serpentine path through the box, which piping system contains a fluid that is heated within the box of the air going through the channel as well as by the radiant energy passing through the thermal glass panel.

Although the solar heat converter disclosed therein is an effective collector and converter of solar energy into heat for use in a building or residence, it would be desirable to increase the volume of air that can be effectively handled by a solar heat converter or heat exchanger of this type.

SUMMARY OF THE INVENTION

It is accordingly a feature of the present invention to provide an improved solar energy collector and heat exchanger of the type which comprises a radiation collecting surface enclosed within a housing which surface absorbs the solar energy of the sun and transfers it to a portable storage medium.

In accordance with the present invention, an improved solar energy collector and heat exchanger includes baffles in the housing that define a first serpentine channel beneath the surface and a second serpentine channel above the surface. Air inlet and air outlet parts in the housing communicate with both the first and the second channels. A fluid system having an inlet and an outlet is provided. A fluid system includes an array of interconnected tubes mounted on the solar absorption surface.

In accordance with more specific aspects of the invention, curved airflow guides are provided in both the first and the second channels. The curved airflow guides are positioned between adjacent baffles and serve to streamline the airflow path inside the channels and facilitate passage of air through the solar heat exchanger. The solar absorption surface is a metallic sheet that comprises wire mesh covered by aluminum foil and has air flow openings therein to interconnect corresponding ends of the lower channel and the upper channel. The baffles are of two piece construction and form upper and lower sets of baffles.

In other aspects of the invention, the array of tubing of the fluid system rests on the solar absorption surface, and cut-outs are formed along the lower edge of the upper baffles to accommodate a separate tube within each cut-out and allow the upper baffles to be positioned in substantially airtight contact with the metallic sheet. Also, the upper baffles are positioned in the upper portion of the housing in an arrangement that corresponds with the arrangement of the lower baffles and defines an upper channel that overlays the lower channel.

DESCRIPTION OF THE DRAWINGS

A more complete appreciation of the invention may be had by reference to the particular embodiment which is described below and is illustrated in the accompanying Drawings, wherein:

FIG. 2 is a sectional view of the assembly details of the solar heat exchanger shown in FIG. 1;

FIG. 4 is a cross-sectional view of the solar heat exchanger of the present invention taken along line 4—4 of FIG. 3;

DESCRIPTION OF THE PREFERRED EMBODIMENT

Figure 1:
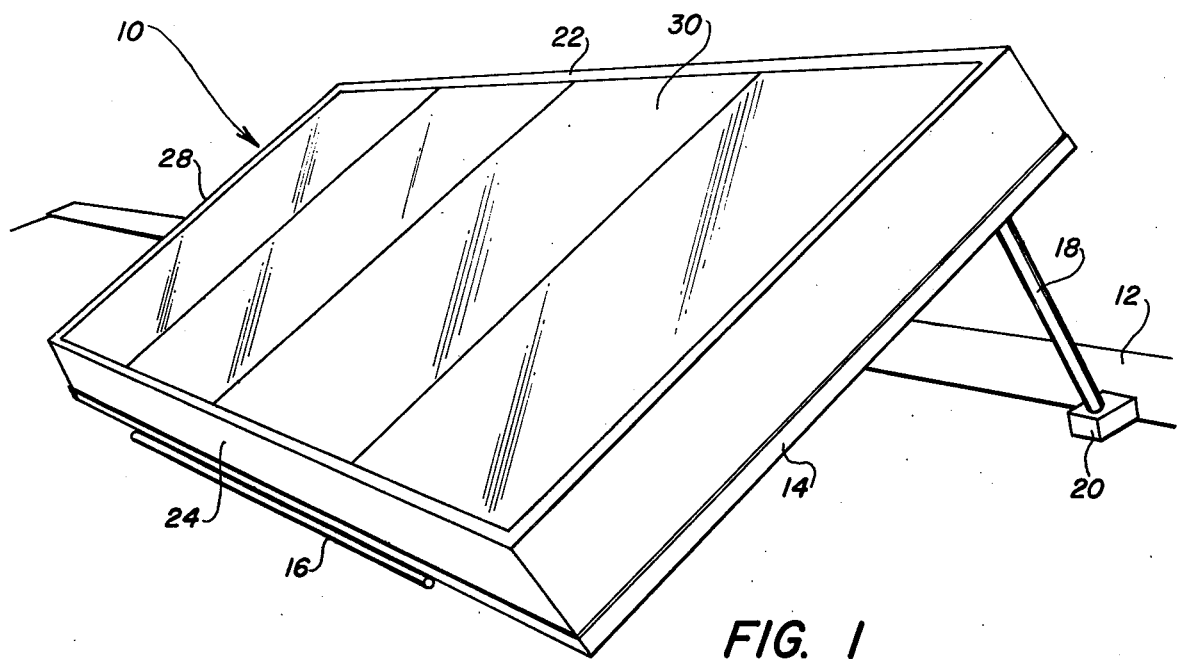
FIG. 1 is a perspective view of a solar energy collector and heat exchanger in accordance with the present invention.

Referring to FIG. 1, the solar energy collector and heat exchanger apparatus of the instant invention is indicated generally by the reference numeral 10 and is shown in position on the roof of a dwelling, such as a house or mobile home. As depicted in FIG. 1, solar collector apparatus 10 is mounted to the roof 12 by an assembly which includes a frame 14 that is pivotally mounted to roof 12 along side 16. Frame 14 is further provided with a pair of adjustable legs, of which only leg 18 is in view. A pivotal anchor block 20 mounted to the roof 12 of the dwelling enables leg 18 to be moved to different locked positions along the back side of frame 14 to vary the angle of vertical inclination of solar energy collector and heat exchanger 10. Such adjustment allows the collector apparatus to be repositioned as the sun's positioning changes to receive the greatest amount of solar radiant energy onto its upper side.

As shown in FIG. 1, solar heat exchanger 10 is of a generally rectangular configuration comprising parallel side members 22, 24 and opposing end members 26, 28 that extend transversely to the side pieces to form a housing 29. A panel 30 is provided to close the top of the housing, which panel is made from a material that readily permits the transmission of radiant energy therethrough. Housing 29 of the apparatus 10 may be constructed from any lightweight, structurally sound material and can be designed to any desired dimensions consistent with the requirements of the building or residential structure that it is to serve. However, housing 29 may be constructed of wooden boards and be on the order of four feet wide and ten feet long for most applications. The housing must be constructed square and level for a tight fit of panel 30, and the joints made by the fastening of the end members to the side members should be by nails or wood screws. Additional details of the construction of apparatus 10 can be had by reference to the assembled sectional view presented in FIG. 2.

In FIG. 2, there is presented a detailed drawing of a section of solar energy collector and heat exchanger apparatus 10 and a presentation of the arrangement of the various components that comprise the assembled structure. Side members 22, 24 which form a part of the outside perimeter of housing 29 are shown resting on a flat sheet-like bottom member 32 that extends completely across apparatus 10 between sides 22 and 24 and forms the back of the housing. Bottom member 32 of the housing may be a sheet of plywood secured in an airtight manner. Also in FIG. 2, a portion of frame 14 is shown, indicating that frame 14 can be constructed of angle iron welded together to form a rectangular frame having both end and side pieces and so configured as to support apparatus 10 thereon about the periphery of housing 29.

Further as shown in FIG. 2, panel 30 covers the top of the housing partially defined by sides 22, 24 and is thermal pane glass cut to length and width dimensions that enable it to be inserted between sides 22, 24 and be partially supported by ledges 34 and 36. Neoprene insulating gasket material is desirably provided along the walls forming ledges 34, 36 to further assure that leakage of air around panel 30 does not occur.

Figure 3:
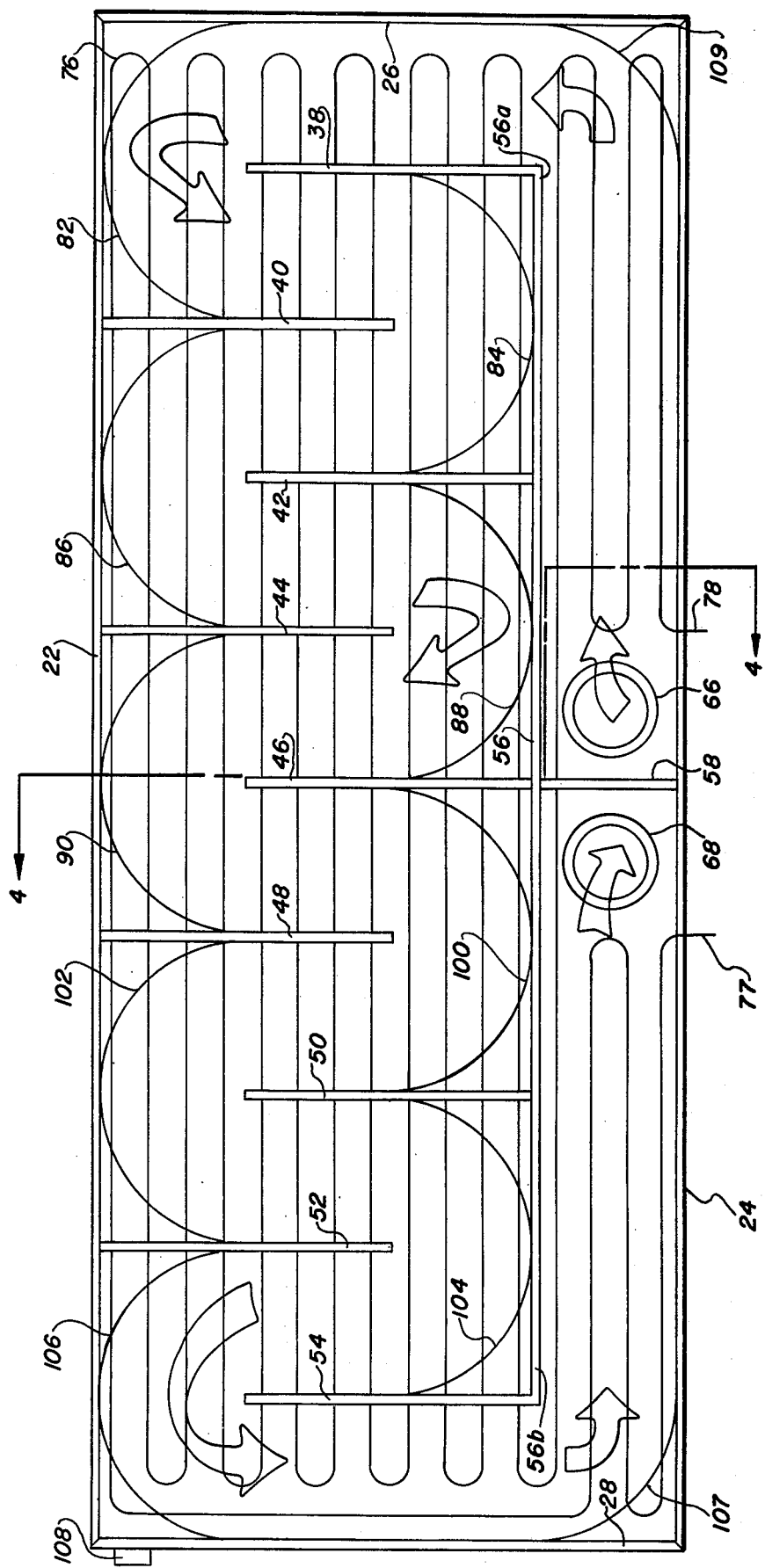
FIG. 3 is a top view of the solar heat exchanger of FIG. 1 with the panel removed therefrom to permit details of the apparatus to be revealed.

With reference now in FIG. 3, apparatus 10 includes a number of vertically standing baffles 38–54 that extend transversely to sides 22, 24 and parallel to ends 26, 28. Baffles 40, 44, 48 and 52 are mounted within solar heat exchanger 10 with one end in abutment with side piece 22. Baffles 38, 42, 46, 50 and 54 are interlaced with baffles 40–52 and are arranged within housing 29 with one end in abutment with an air guide support 56 comprised of pieces 56a and 56b that are aligned end-to-end. Air guide support pieces 56a, 56b extend generally parallel to side pieces 22, 24 and are displaced off-center toward side piece 24. Air guide support pieces 56a, 56b are joined end-to-end at a location coinciding with the position of baffle 46, which position is approximately equal distance between the ends 26, 28 of housing 29. Finally, yet another baffle 58 is provided extending between air guide support 56 and side piece 24. Baffle 58 is aligned with baffle 46 and accordingly is disposed intermediate the ends of housing 29.

From reference to FIG. 2, it can be seen that the baffles contained in housing 29 are of two piece construction to provide, in effect, upper and lower baffles that are separated apart a distance defined by the thickness of a metallic sheet 70. The view from above housing 29 in FIG. 3 taken in conjunction with FIG. 2 illustrates the positional relationship between the two pieces of each baffle and shows that the upper baffles are positioned in the upper portion of housing 29 above sheet 70 in an arrangement that corresponds with the arrangement of the lower baffles secured to the bottom 32 of the housing.

Details of the construction of a representative one of the baffles in apparatus 10 may be had by reference to FIG. 4. More specifically, a section of housing 29 is presented therein and shown as an enlargement. The section includes a portion of side member 24, baffle 46, air guide support 56 and baffle 58. The two piece construction of baffles 46 and 58 is evident, with air guide support 56 also being of two piece construction. For example, baffle 46 provides a lower baffle 60 and an upper baffle 62. As previously discussed, the baffles, as are the two sections of air guide support 56, are arranged one above the other with the top edge of lower baffle 60 being aligned from one end to the other with the bottom edge of upper baffle 62. Baffle 46, as are all baffles, is constructed from wooden boards having dimensions consistent with the overall size of apparatus 10.

As best shown in FIG. 3, the baffles provided in solar heat exchanger 10 define a serpentine path for airflow through housing 29 as indicated by the arrows. More specifically, the lower baffle sections define an uncovered serpentine channel 64 (see FIG. 2) in the lower portion of the housing 29. The channel 64 so formed provides a path through the lower portion of housing 29 for air that enters an air inlet port 66 and leaves housing 29 through air outlet port 68. Both air inlet port 66 and air outlet port 68 are mounted in the bottom of housing 29 and are positioned on opposite sides of baffle 58.

Referring now to FIG. 2 metallic sheet 70 is shown extending horizontally across housing 29 above channel 64, closing the top thereof and defining a ceiling for the channel. In the embodiment shown, metallic sheet 70 comprises wire mesh 71 having an aluminum foil covering 73 painted black to enhance its heat absorption and retentivity characteristics. Sheet 70 is secured around its edges to a nailing strip 75 that extends about the inside of housing 29. Nailing strip 75 comprises a small strip of wood attached to the inner wall surface of each of the side and end members of housing 29 and positioned vertically such that the top edge of the strip is level with the top edge of each of the lower baffles.

Figure 6:
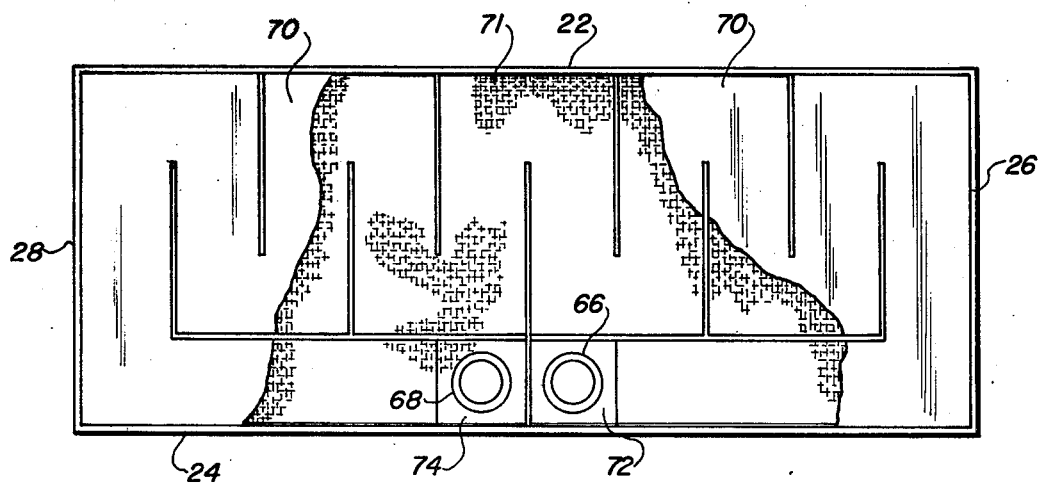
FIG. 6 is a top view of the solar energy collector and heat exchanger shown in FIG. 1 with the fluid system removed and which illustrates the layout of the metallic sheet covering the lower channel and the arrangement of the airflow connections to the upper portion of the housing.

Briefly referring to FIG. 6, the layout presented therein for metallic sheet 70 indicates that an area 72 around air inlet port 66 and an area 74 around air outlet port 68 are left open and uncovered by metallic sheet 70. Open areas 72 and 74 in metallic sheet 70 provide air flow connections therethrough from each of the air inlet and air outlet ports to the upper portion of housing 29.

Referring once again to FIG. 2, in conjunction with FIG. 3, there is shown a fluid system comprising a planar array of tubing 76 contained within the confines of housing 29. The planar array of tubing 76 is positioned above metallic sheet 70 and, as further shown in FIG. 5, rests thereon. An inlet portion 77 extends through side member 24 to provide an external inlet for the introduction of fluid into the fluid system. Similarly, an outlet 78 extends through side member 24 a short distance away from inlet 77 and provides an external outlet for fluids that are circulated through the array of tubing 76. In the embodiment shown, the array of tubing 76 can be comprised, for example, of one inch copper tubing coils which, as shown, pass back and forth longitudinally across housing 29 with twelve separate tubing sections connected together by couplings.

The fluid system can be utilized in a variety of ways. For example, inlet 77 to tubing array 76 can be connected to a city water supply having adequate pressure to establish flow through the fluid system. The outlet 78 can be connected to a hot water heater and supply pre-heated water thereto, or it can be connected to individual appliances that utilize hot water to perform their intended functions.

Figure 5:
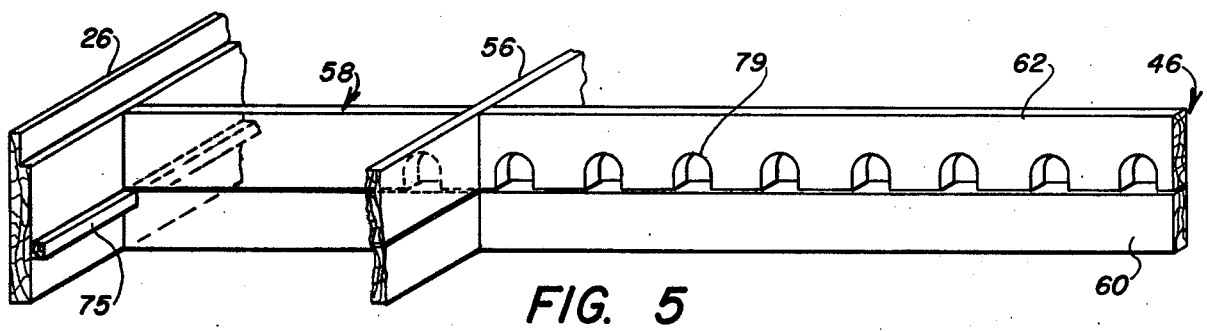
FIG. 5 is an oblique section illustrating the details of the construction of the baffles used in the particular embodiment shown.

As shown in FIGS. 4 and 5, the upper baffles, of which baffle 46 is representative, have cut-outs 79 along the lower edge. Cut-outs 79 in baffle 46, are sized to accommodate the insertion within each cut-out of the particular size of tubing used in the array 76. Accordingly, the upper baffles are mounted upon sheet 70 in the upper portion of housing 29 with the upper baffles being placed directly above the lower baffles and having the longitudinal runs of the tubing array 76 passing transversely therethrough. With cut-outs so fashioned in the upper baffles, it is only the portion of the lower edge of each baffle between adjacent cut-outs that actually rests on metallic sheet 70.

The upper baffles define an upper channel 80 above metallic sheet 70 that follows the same path as that defined by the lower baffles. Panel 30 that covers the top of housing 29 defines the ceiling for upper channel 80. As open areas 72 and 74 are provided in metallic sheet 70, there is free airflow between the upper and lower portions of the housing, and air entering air inlet port 66 flows both through lower channel 64 and upper channel 80. Correspondingly, air leaving heat exchanger 10 through air outlet port 68 will be the combined airflow of both lower channel 64 and upper channel 80.

Shown in FIG. 2 in perspective and in FIG. 3 from above, airflow guides 82–106 are provided to facilitate the smooth flow of air through both the upper channel 80 and the lower channel 64. Similar to baffles 38–54, airflow guides 82–106 are of two piece construction to define upper and lower guides. The upper and lower airflow guides are semi-circular in shape and are disposed between adjacent pairs of baffles. For example, the lower airflow guides of airflow guide 86 is positioned between the baffles in the lower portion of housing 29 at the baffle locations generally designated in FIG. 3 by the numerals 40 and 44. Airflow guide 86 is so positioned between baffles 40 and 44 that it is circumscribed by the open-ended rectangle defined by baffles 40, 44 in combination with side member 22. The airflow guides 84, 88, 100 and 104 are similarly positioned between adjacent baffles, however, those airflow guides are circumscribed by open-ended rectangles formed by the adjacent baffles in combination with air guide support 56. Airflow guides 82 and 106 which are at the ends of channels 64 and 80 are positioned between the respective end member of heat exchanger 10 and the baffle adjacent thereto that also abuts side member 22.

Additional airflow guides are provided at the inlet and outlet corner locations designated by the numerals 107 and 109 in both the upper and lower airflow channels. However, rather than being semi-circular, or 180 degrees arc, the additional airflow guides are only 90 degree elbow bends. As shown in FIG. 3, these additional airflow guides are positioned within and subtended by side member 24 and end members 26, 28.

A number of materials can be used to construct a solar energy collector and heat exchanger in accordance with the present invention. As stated previously, the preferred embodiment described herein preferably uses wood as a primary construction material. It is recommended, however, that all interior wood exposed to radiant energy entering housing 29 through panel 30 be covered with aluminum foil and painted black. In addition, each of the longitudinal runs of the array of tubing 76 should be covered with aluminum foil and painted black.

In use, the solar energy collector and heat exchanger shown and described herein can be advantageously utilized to reduce the energy consumption of a building or residence by efficiently collecting the radiant solar energy from the sun and utilizing that energy in space heating and/or pre-heating of the water to be used in the house. It is contemplated that the use of a solar heat exchanger in accordance with the present invention would, during the winter, be such that substantially all space heating of the home, except on extraordinarily cold days, would be provided by the apparatus. In addition, assistance would be given to the water heater. In the summer, when it is no longer necessary to warm the home, the flow of air through the heat exchanger would be terminated and all of the heat exchanging capability of the solar heat exchanger would be directed to the heating of water to be used in the dwelling.

Application to a solar heat exchanger in accordance with the present invention, and meeting the description of the preferred embodiment, to a 1270 square foot, three bedroom home with one and one-half baths in an experimental use of the apparatus has indicated that the apparatus can be effective to lower utility expenses through the reduction of the amount of energy needed to heat and maintain the home at comfortable temperatures. In the application mentioned, a solar heat exchanger having dimensions of four feet by ten feet has been found effective to maintain an inside temperature within the house of the size described at a mean temperature of 72 degrees F. during a period of time when the mean temperature outside was 43 degrees F.

The solar heat exchanger in accordance with the present invention, and as described herein, may also be utilized in conjunction with a thermostatically controlled furnace. For example, and with reference to FIG. 3, a thermostatically controlled switch 108 shown mounted to end piece 28 can be provided to control the energization of an electrical heating control circuit for the furnace. The switch can be adjusted to energize the circuit and initiate furnace operation at a predetermined low air temperature. It will of course be recognized that the thermostatically controlled switch 108 must be positioned at a point near the air outlet in apparatus 10 in order to determine the effectiveness of the solar collector and heat exchanger in warming the air passing through it to the desired room temperature.

Whereas the present invention has been directed with respect to a specific embodiment thereof, it will be understood that various changes and modifications will be suggested to one skilled in the art, and it is applicant's intention to encompass such changes and modifications as fall in the scope of the appended claims.

What is claimed is:

1. A solar energy collector and heat exchanger, which comprises:
   (a) a housing having an open top and a closed bottom;
   (b) a metallic sheet positioned in said housing to define a lower chamber;
   (c) a first set of baffles in said lower chamber defining a first serpentine channel for directing air flow through said lower chamber;
   (d) a second set of baffles above said metallic sheet in said housing defining a second serpentine channel for directing air flow therealong;
   (e) an air inlet port extending into said housing and communicating with said lower chamber at one end of said first channel;
   (f) an air outlet port extending out of said housing and communicating with the lower chamber at the other end of said first channel;
   (g) structure forming flow openings in said sheet at the ends of said second channel and positioned for air flow therethrough upon air flow through said first channel;
   (h) a fluid system including a tube defining a serpentine path through said housing above said metallic plate, said fluid system having an inlet and an outlet; and
   (i) a transparent panel covering the top of said housing to complete an upper chamber in said housing and to permit the transfer of radiant energy from the sun to said metallic sheet and to said tube of said fluid system thereby heating air passing through the upper and lower chambers of the housing and heating fluid passing through said fluid system.

2. A solar energy collector and heat exchanger in accordance with claim 1 wherein said second set of baffles are positioned in the upper portion of the housing in an arrangement that corresponds with the arrangement of the lower baffles and defines an upper channel that overlays the lower channel.

3. A solar energy collector and heat exchanger in accordance with claim 1 wherein the panel closing the top of said housing is a thermal pane glass panel placed upon said second set of baffles to form the ceiling for the upper channel.

4. A solar energy collector and heat exchanger in accordance with claim 1
   wherein said first set of baffles includes partitions extending alternately from opposite sides of said housing having a curved semicircular surface positioned between each adjacent pair of walls extending from a common side of said housing, said semicircular surface being substantially perpendicular to the bottom of said housing; and
   wherein said second set of baffles includes partitions extending alternately from opposite sides of said housing having a curved semicircular surface positioned between each adjacent pair of walls extending from a common side of said housing, said semicircular surface being substantially perpendicular to the bottom of said housing such that the flow of air through the upper and lower chambers are turned by said curved semicircular surfaces to facilitate the flow of air therethrough.

5. A solar energy collector and heat exchanger in accordance with claim 1 wherein said metallic sheet has the array of tubing of the fluid system resting thereon.

6. A solar energy collector and heat exchanger in accordance with claim 5 wherein each said upper baffles has a series of cut-outs along the lower edge thereof, each of said cut-outs accommodating a separate tube of said array therein, with the portion of the lower edge of each baffle between adjacent cut-outs resting on said metallic sheet.

7. A solar energy collector and heat exchanger in accordance with claim 1 wherein said air inlet port and said air outlet port are mounted in the lower portion of said housing and open through the bottom of said housing, and wherein the airflow openings in said metallic sheet are positioned directly over said ports.

8. A solar energy collector and heat exchanger in accordance with claim 1 wherein said metallic sheet comprises wire mesh having a dark surfaced aluminum foil covering.

9. A solar energy collector and heat exchanger in accordance with claim 1 wherein said housing is rectangularly shaped and comprises a pair of side members and a pair of opposing end members.

10. A solar energy collector and heat exchanger in accordance with claim 9 wherein said first and second sets of baffles each comprise an air guide support extending parallel to and laterally spaced from one side member of said housing, a first grouping of individual baffles oriented transverse to and in abutment with said air guide support, and a second grouping of individual baffles oriented transverse to and in abutment with the other side member of said housing.

11. In a solar energy collector and heat exchanger of the type having a glass-topped housing enclosing a heat absorbing structure for absorbing solar radiation and transferring the energy by conduction to two different portable storage mediums, the combination comprising:
    baffles disposed in said housing both below and above said structure and defining a first lower serpentine channel beneath said structure and a second upper serpentine channel above said structure;

air inlet and air outlet ports in said housing and through said structure communicating with both of said first and second serpentine channels and positioned for concomitant air flow both above and below said structure from said air inlet to said air outlet; and a fluid system having an inlet and an outlet and comprising an array of interconnected tubes mounted on the upper surface of said structure and in the path of the second serpentine channel.

12. A solar energy collector and heat exchanger in accordance with claim 11 further comprising airflow guides in said first and second channels.

13. A solar energy collector and heat exchanger in accordance with claim 11 which further comprises:

an air inlet port in said housing communicating with one end of said lower channel;

an air outlet port in said housing communicating with the other end of said lower channel;

a first airflow opening in said structure inteconnecting one end of the upper channel with a corresponding end of the lower channel; and a second air flow opening in said structure interconnecting the other end of the upper channel with the other corresponding end of the lower channel.

14. A solar energy collector and heat exchanger in accordance with claim 11 wherein said baffles are of two piece construction and wherein said structure separates the upper baffles from the lower baffles.

15. A solar energy collector and heat exchanger in accordance with claim 11 wherein said solar energy absorbing structure comprises a wire mesh covered with a dark surfaced aluminum foil.

16. A solar energy collector and heat exchanger in accordance with claim 11 wherein the interconnected tubes of said fluid system extend transversely of said baffles and define a serpentine path through said housing.

17. A solar energy collector and heat exchanger in accordance with claim 11 which further comprises a thermostatically controlled switch carried on said housing, said switch being operable to actuate auxiliary temperature control means in response to the existence of a predetermined temperature of the air moving through said upper and lower channels.

* * * * *

UNITED STATES PATENT AND TRADEMARK OFFICE
CERTIFICATE OF CORRECTION

PATENT NO. : 4,159,708
DATED : July 3, 1979
INVENTOR(S) : Donald L. Pyle

It is certified that error appears in the above-identified patent and that said Letters Patent are hereby corrected as shown below:

Column 2, line 6     "of" should be --by--.

Column 4, line 13     "in" should be --to--.

Column 6, line 65     "to" should be --of--.

Signed and Sealed this

Twenty-third Day of October 1979

[SEAL]

Attest:

RUTH C. MASON
Attesting Officer

LUTRELLE F. PARKER
Acting Commissioner of Patents and Trademarks